United States Patent [19]
Brunner

[11] 3,768,613
[45] Oct. 30, 1973

[54] FLUID CLUTCH HOUSING
[75] Inventor: Gerald F. Brunner, Kirtland, Ohio
[73] Assignee: Towmotor Corporation, Cleveland, Ohio
[22] Filed: Sept. 10, 1971
[21] Appl. No.: 179,283

[52] U.S. Cl............................ 192/113 B, 188/264 E
[51] Int. Cl............................................. F16d 13/74
[58] Field of Search ............................. 192/113 B; 188/264 E

[56] References Cited
UNITED STATES PATENTS
3,366,210  1/1918  Webster .......................... 192/113 B
3,610,384  10/1971  Borck .............................. 192/113 B Primary Examiner—Charles J. Myhre
Assistant Examiner—Randall Weald
Attorney—Charles M. Fryer et al.

[57] ABSTRACT

A wet-type, friction-disc clutch having an internal, fluid control distribution and reservoir system which provides lubrication and cooling fluid for the clutch discs, and which is self-priming and nonsiphoning and will limit drain back from the reservoir to the rotative members when the clutch members are not rotating. All the component members of the system are located within the confines of the clutch housing, thus a simple and compact unit with no external fluid connections is provided.

8 Claims, 6 Drawing Figures

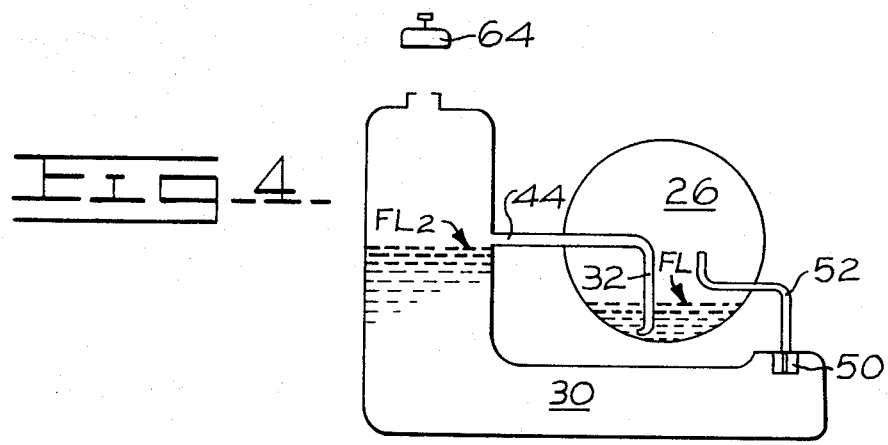
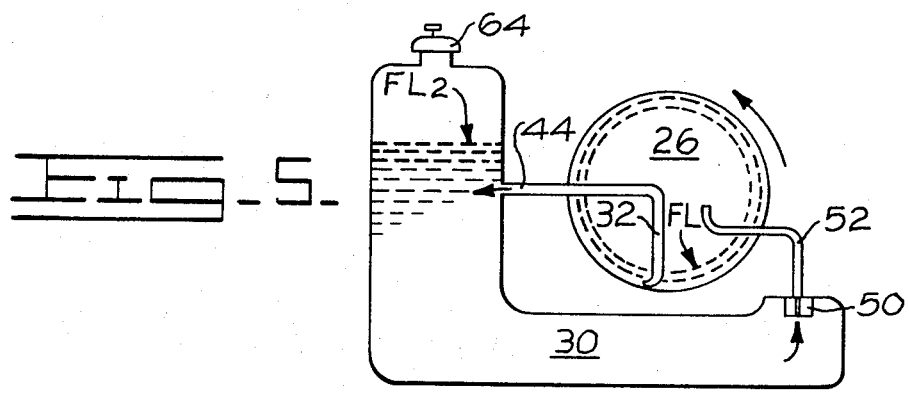
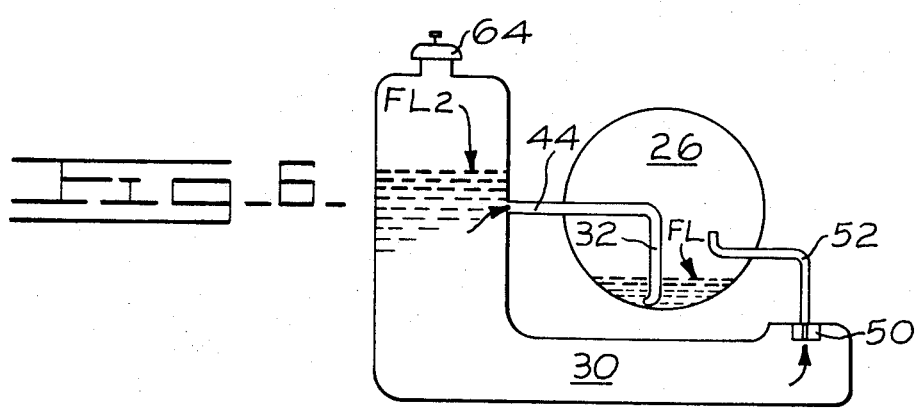

FLUID CLUTCH HOUSING

BACKGROUND OF THE INVENTION

It has long been a goal of industry to provide a mechanical clutch mechanism with a large power-transmitting capacity, a long, uninterrupted service life, and to supply this unit in a compact configuration at a minimal cost.

The popular dry-disc type of clutch is comparatively compact, but has a relatively short service life and is generally lower in capacity than the wet-disc type.

The usual wet-disc type generally operates in an oil bath, thus it is somewhat larger than a comparable dry-disc unit and sometimes necessitates a power boost for the operator's control means because increased actuating force is needed to disengage the clutch plates with lubricating and cooling fluid between them.

Wet-disc-type clutches are available with both wet and dry housings. The wet-housing type has the inherently disadvantageous characteristic of heating the working fluid to such an extent that a separate oil cooler is often required to avoid overheating of the clutch mechanism. This fluid heating, which causes a loss in engine power, is caused by clutch plate slippage and by the splashing and churning of the fluid within the housing which results from the rotation of the clutch components and flywheel-ring gear teeth. U.S. Pat. No. 3,366,210 to Webster teaches a conventional wet-housing clutch which could exhibit this problem and which also can allow oil which is in the gravity-feed distribution reservoir to drain back into the main clutch reservoir when the clutch is not operative. This conventional system is not self-priming and does not protect against oil siphoning when the engine with which it is associated is stopped.

The dry-housing type of wet clutch does not splash and churn the working fluid because the rotating parts operate within a dry compartment. Thus, the fluid-heating and horsepower-loss problems are not encountered with this type of clutch.

Fluid lubricating and cooling systems for wet-disc clutches are of various kinds. There is a positive-pressure-pump type, such as is shown in U.S. Pat. No. 3,452,848 to Brunner. Such a system requires a fluid-pressure pump, a fluid-control orifice, a fluid reservoir, a low-pressure warning system, and lines and fittings which connect these components to the clutch mechanism. All of this apparatus is costly and susceptible to operational difficulties in use. Another lubricating and cooling system is generally referred to as a splash system. It does not rely upon a positive pumping means, but rather distributes the fluid to the various components by means of a combination of centrifugal force and gravity flow. Such a system is disclosed in the aforementioned Webster patent. Other splash system designs use a reservoir which is located above the clutch members in such a manner that gravity flow to the working parts is assured. This kind of arrangement requires a regulating valve or the like to prevent fluid from draining back or siphoning from the reservoir to the operating clutch mechanism. Such flow-checking components are expensive and can be a source of trouble if they malfunction or if external fluid leakage occurs. They also require external mounting space and increase the size of the unit.

SUMMARY OF THE INVENTION

The instant invention relates to an improvement in an integral, dry-housing, wet-disc-type friction clutch. This invention incorporates a fluid reservoir and the fluid control and delivery system within the confines of the clutch housing. This internalization of systems eliminates the need of externally located components such as a reservoir tank, fluid control valve and the external lines and fittings associated therewith. Hence, the subject clutch, with its special lubricating and cooling system, provides a vastly superior unit with a lower initial cost, reduced complexity and number of parts, and a compact outside dimension. It is also self-priming and includes a fluid-level maintenance system which assures that the rotative operating members receive lubrication and cooling fluid even when the clutch is first activated from its static condition. The aforementioned system also prevents siphoning of reservoir fluid and limits fluid drain-back from the reservoir to the clutch members when the clutch is deactivated.

Specifically, the clutch housing members include a fluid reservoir, a portion of the fluid distribution means, and a fluid control means. The lubrication and cooling system operates by virtue of one or more stationary ram tubes which pick up fluid from the rotating-clutch inner housing in such a manner that the fluid is pressurized and directed to the reservoir. The reservoir is thus pressurized by the incoming fluid and the fluid is forced through a metering-orifice passage in the housing and finally delivered, through various internal passages, to the clutch discs for lubrication and cooling purposes. The particular location of the fluid reservoir as well as the disposition of its pressurizing inlet and outlet are important features of the system, as is the size of the metering orifice.

It is a primary object of this invention to provide a fluid-clutch lubrication and cooling system which is completely self-contained, and does not require an externally located reservoir, control valves, or connecting lines and fittings.

Another object of this invention is to provide a compact clutch unit for use in a confined area.

A further object is to provide a fluid reservoir which is an internal part of a clutch housing, and is so located within said housing that only a predetermined amount of fluid can drain back from the rotative members of the clutch to the reservoir when the clutch is inoperative.

A still further object of this invention is to provide a lubrication and cooling system that is self-priming and nonsiphoning.

Another object is to replace the large, costly and complex fluid control valve system usually associated with prior art clutches, with a small, inexpensive, internally-located flow control orifice means.

Other objects and advantages of the present invention will become apparent from the following description and drawings.

BRIEF DESCRIPTION OF THE DRAWINGS

FIGS. 4–6 are schematic representations of the instant system showing the fluid flow characteristics thereof during the initial fill, normal, and shutdown stages of operation, respectively.

DETAILED DESCRIPTION

Figure 1:
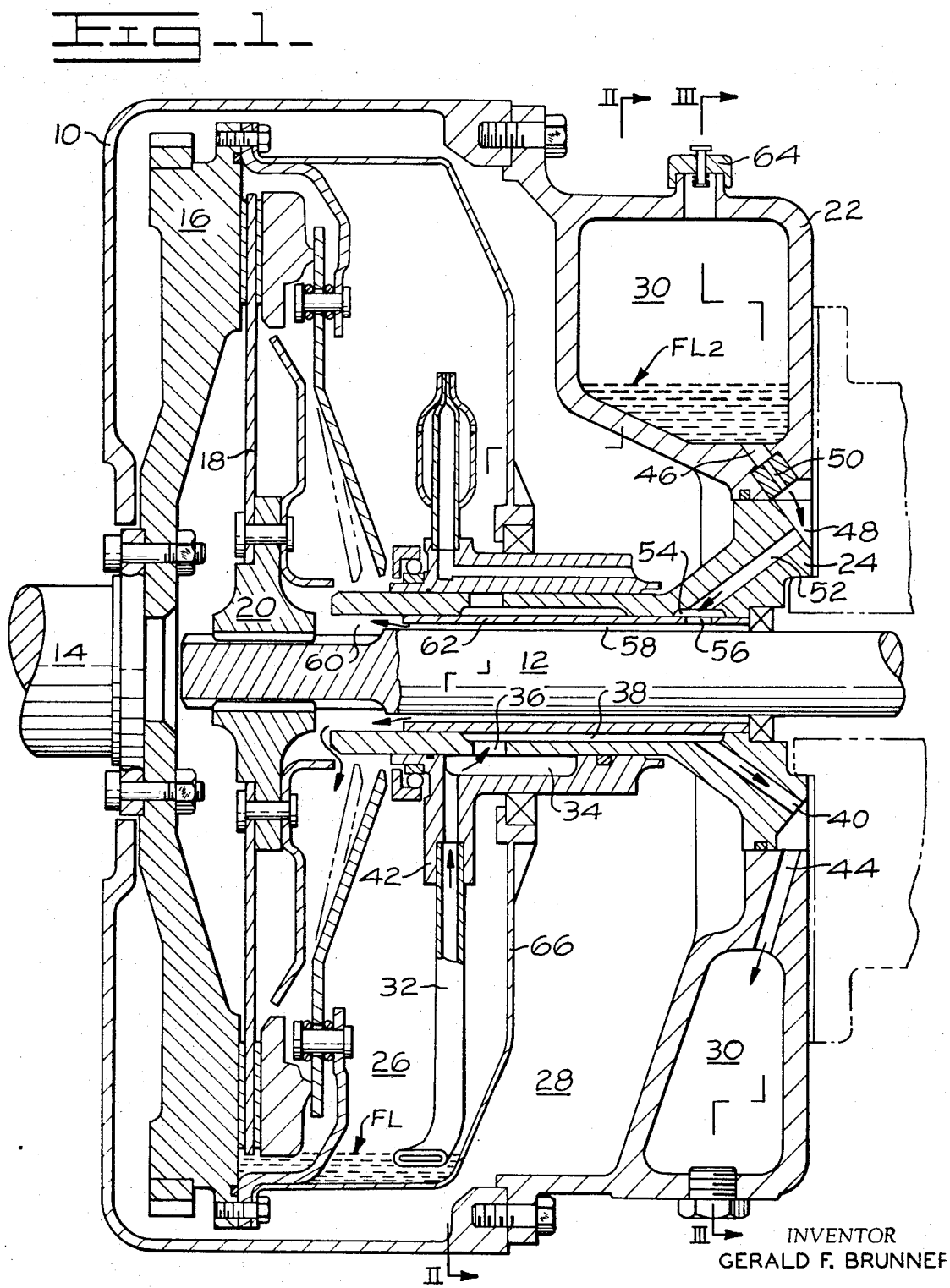
FIG. 1 is a side elevational view, partly in section, of the clutch assembly.

Referring now in detail to the drawings, particularly FIG. 1, a dry-housing-fluid lubricated and cooled, wet-disc clutch is presented, wherein reference character 10 represents a dry housing of known construction.

At 14 is shown an engine crankshaft which rotates along with an engine flywheel 16 which flywheel can selectively engage clutch disc 18. The splined hub 20 transmits movement to the clutch output shaft 12 in the known manner to produce useful torque.

The instant lubrication and cooling system includes one or more ram tubes 32 which pick up fluid from a sump in a rotating clutch compartment 26 contained within the rotating housing member 66. The compartment shown at 28 is a dry compartment segregated from compartment 26 by means of appropriate seals. Fluid is moved through the system by means of a natural pressure buildup caused by a combination of centrifugal force and friction of the fluid in the sump. From the ram tubes 32, it passes into an annular chamber 34, formed in member 42, and then through a series of radially disposed apertures 36 in a tubular portion of a non-rotating housing member 24. The fluid then flows into an annular chamber 38 located radially inwardly of the tubular portion of the housing 24, thence through an obliquely, radially disposed passageway 40 into the passage 44 in the shell-like housing 22, and finally into the annular reservoir chamber 30 which is defined outwardly by said shell-like housing 22.

Due to the above-described, natural pressurization, the working fluid in reservoir 30 is pressurized to such an extent during clutch operation that a portion of it is forced from the reservoir 30 into a housing passage 46 and then through one or more regulating orifices 50 into a cored area 48 of the housing portion 24 from whence it passes into connecting passages 52 to an annular ring chamber 54. From chamber 54, it then progresses through sleeve member 62 by way of a plurality of radially disposed ports 56 into an annular area 58 which is disposed between the sleeve member 62 and the output shaft 12. It then passes axially into an area 60 from which it is directed into and between the clutch facings and discs 18 for the lubrication and cooling thereof. The sleeve 62 is inserted with an interference fit into the housing 24 so as to prevent any undesired fluid leakage between annular areas 58 and 38.

The fluid reservoir 30 is provided with a pressure relief device 64, which maintains a predetermined pressure in the reservoir and a consequently controlled fluid flow to the clutch members and which is calibrated to relieve any excess pressure for reasons of safety and continued clutch performance. It is understood that the pressure relief means can be a part of a fluid filler cap, as shown in FIGS. 1–3, or it can be separately incorporated into the upper portion of the reservoir 30.

During clutch operation, the foregoing sequence will occur so long as the fluid level FL in the sump 26 will be maintained as shown and so long as the fluid level $FL^2$ in reservoir 30 is maintained at a given, predetermined level. The level in reservoir 30 may be readily checked either when the engine is stopped or when it is idling at normal speed. This is due to the strategic location of the reservoir inlet 44 and outlet passage 52 leading to the rotative clutch compartment 26.

Figure 2:
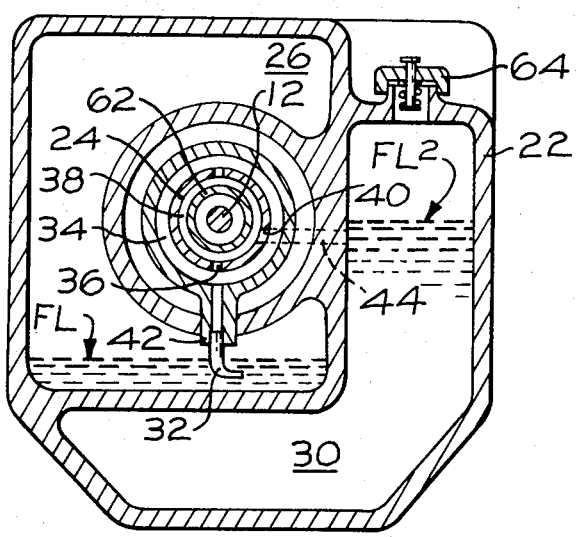
FIG. 2 is a sectional view, taken along the line II—II in FIG. 1, and showing part of the fluid flow path.
Figure 3:
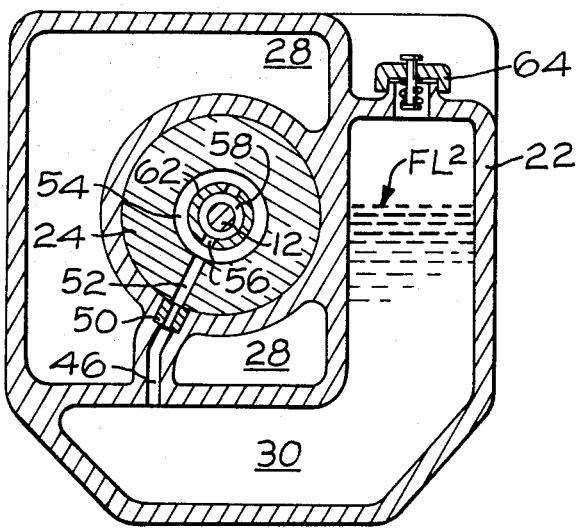
FIG. 3 is a sectional view, taken along the line III—III in FIG. 1, and illustrating the fluid flow path from the pressurized reservoir to the rotative members.

The fluid level FL is assured in the sump by the particular placement of the ram tube 32 within the chamber 26, as shown best in FIGS. 1 and 2, as well as by the maintenance of a proper fluid level in reservoir 30. It can be seen that the reservoir 30 is built into the housing member 22 in partially surrounding disposition to the chambers 26 and 28. It is this disposition, and that of the various fluid passages, together with the resulting relationship between the fluid levels in the various chambers, which prevent excessive fluid drain-back from the reservoir and assure that the assembly will be primed upon starting. Suitable sealing means are provided where applicable in accordance with conventional practice to prevent fluid leakage from one clutch compartment or member to another.

With particular reference to FIGS. 4–6, the priming and drain-back limiting features will be more fully discussed.

In FIG. 4, which is a schematic showing of the system component relationships and fluid flow characteristics during the initial fill or primed stage, it will be noted that a predetermined amount of prime fluid FL has drained from the reservoir 30 by way of the inlet 44 and outlet 52 into the rotating clutch compartment or sump 26 under the influence of gravity. The fluid level in the reservoir 30 is designated as $FL^2$.

FIG. 5 is a representation of the same components but showing the fluid levels and movements during normal operations. The arrows shown indicate normal directions of flow. The rotating clutch compartment housing 26 revolves, as previously indicated, and forces the prime fluid to assume the disposition shown at FL. This causes the ram tube 32 to fill with fluid for delivery under pressure to the reservoir 30 by way of the passage 44. The reservoir is thus pressurized to a predetermined degree which is governed by the pressure relief device 64 and by the size of the orifice 50. Such reservoir pressurization avoids the need for the extremely high fluid head usually found in prior art clutch systems. In the instant system, internally developed reservoir pressure is utilized to force fluid back to the clutch members at approximately the same rate as the ram tube is removing it from the sump, thus achieving a balanced transfer of fluid between the compartments without recourse to high-pressure producing external pumps or the like.

If the reservoir cap 64 were to be removed with the engine operating at idle speed, the particular disposition of the inlet 44 and outlet passage 52 would cause a gravity return of only the prime fluid to the compartment 26. The system would return to the condition shown in FIG. 4. This self-priming feature assures that there will always be sufficient fluid in the sump 26 and passage 52 for adequate cooling and lubrication.

FIG. 6 indicates the fluid movements and levels in the system immediately after engine shut-down occurs. The directional arrows show fluid movement as the pressure in reservoir 30 descends from above atmospheric and the fluid level $FL^2$ is above the reservoir inlet 44. As reservoir pressure returns to atmospheric, passages 44 and 52 return fluid from the reservoir to the now stationary clutch compartment 26 which is at a lower pressure than the reservoir. Fluid flow ceases in line 52 when the reservoir pressure reaches atmospheric, and siphoning through passage 44 to compartment 26 ceases when the fluid level $FL^2$ falls below the port opening into the reservoir and allows air to expel through the passageway 44. As is apparent, the particular location of reservoir passage 44 determines the volume of fluid which will be allowed to siphon from the reservoir to the clutch rotative compartment.

It should be understood that the lubrication and cooling system shown and described is readily adaptable to different types of clutches, some of which might be considerably different from that herein described and shown, without departing from the spirit of the invention and the scope of the appended claims.

I claim:

1. A clutch housing means adapted for use with a fluid-cooled and lubricated disc clutch, said housing means comprising; an annular shell member for enclosing working components of said disc clutch, a fluid reservoir means for supply cooling and lubricating fluid formed within said shell member as an integral part of said shell member, said shell member being formed as one piece with said reservoir means, means for pressurizing said fluid reservoir, fluid passage means formed within said shell member for transferring cooling and lubricating fluid to and from said reservoir means to and from said working components of said disc clutch, said fluid passage means including priming means having first conduit means with a first outlet and a first inlet and second conduit means with a second inlet and second outlet and wherein said first outlet is positioned relative to said first inlet and second inlet and outlet for maintaining at least a predetermined amount of priming fluid in said fluid reservoir at all times.

2. The invention of claim 1 wherein said housing means further comprises a tubular portion which sealingly engages said annular shell member and which is adapted to receive an output shaft means of said disc clutch.

3. The invention of claim 1 wherein said priming means include a flow-controlling orifice located within said fluid passage means in a portion of said passage means leading from said reservoir means to said working components.

4. The invention of claim 1 wherein said integrally formed fluid reservoir means is pressurized when said disc clutch is operating and wherein pressure regulating means are mounted upon said shell member in communication with said reservoir means to maintain said reservoir between a predetermined range of positive pressures.

5. The invention of claim 1 wherein said integrally formed fluid reservoir means are located in said shell member in a position relative to said working components which limits the amount of possible fluid drainback from said fluid reservoir means to said working components when said working components are inoperative such that a controlled fluid level is maintained in the portion of said annular shell member wherein said working components reside.

6. The invention of claim 1, in combination with a pair of fluid-cooled and lubricated clutch disc means one of said clutch discs being operatively connected to a clutch output shaft means, said disc means and said output shaft means being removably received within said clutch housing means whereby lubrication and cooling for said clutch disc means are provided by said fluid reservoir means and said fluid passage means without recourse to cooling and lubricating apparatus external to said clutch housing means.

7. The invention of claim 1 wherein, when said housing means is disposed in normal operative position, said first outlet is disposed vertically higher than said second outlet and inlet and said first inlet.

8. The invention of claim 7 wherein said means for pressurizing said reservoir include a flared portion on said first conduit means first inlet and wherein a flow-controlling orifice means is provided in said second conduit second inlet for restricting flow from said fluid reservoir means.

* * * * *